Sept. 27, 1966  E. S. MORAN, SR  3,274,845
INTERMITTENT DRIVE UNIT
Filed Sept. 13, 1963  7 Sheets-Sheet 1
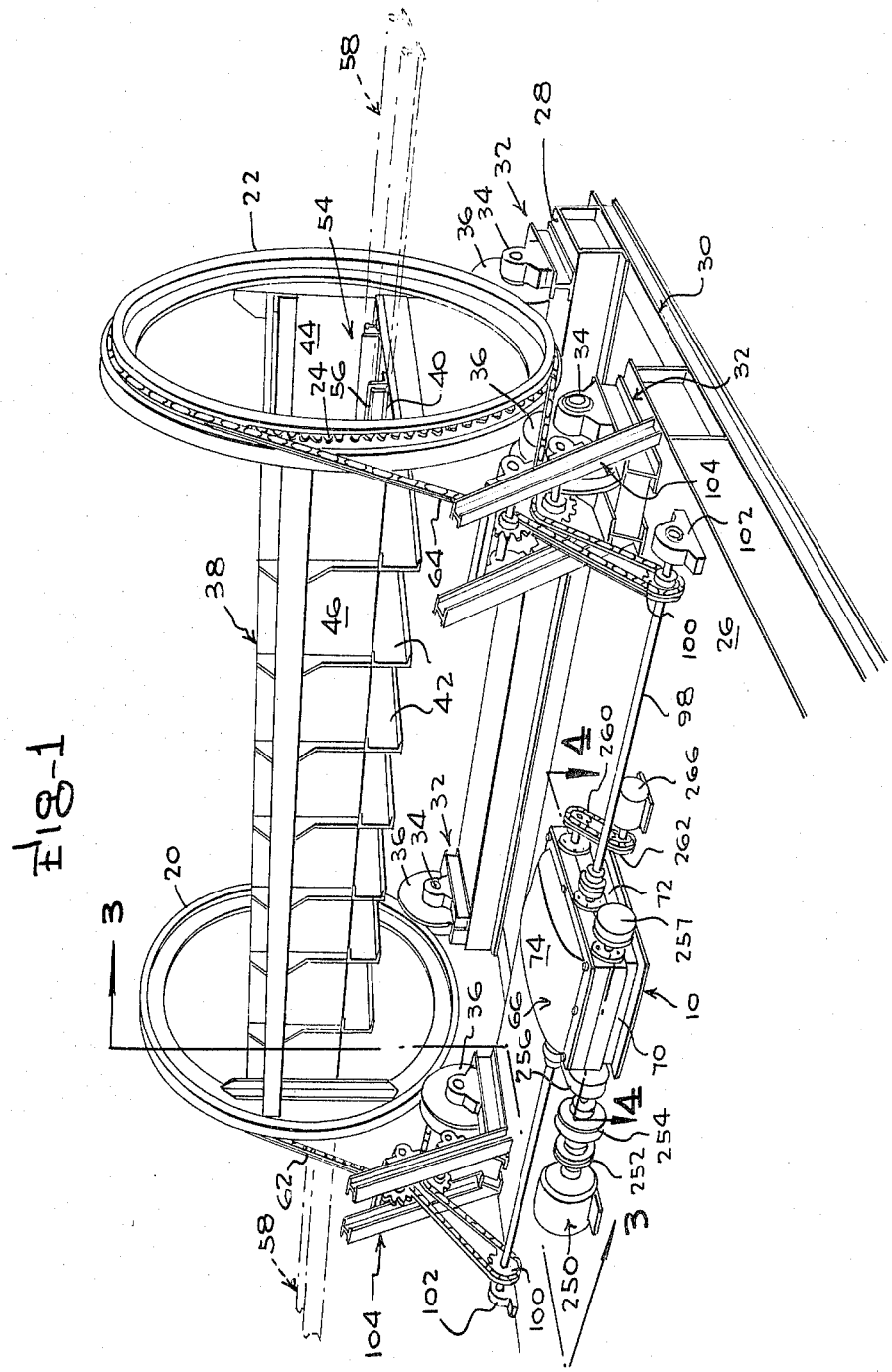
INVENTOR.
EDWARD S. MORAN, SR.
BY
McMorrow, Berman & Davidson
ATTORNEYS Sept. 27, 1966  E. S. MORAN, SR  3,274,845
INTERMITTENT DRIVE UNIT
Filed Sept. 13, 1963  7 Sheets-Sheet 2
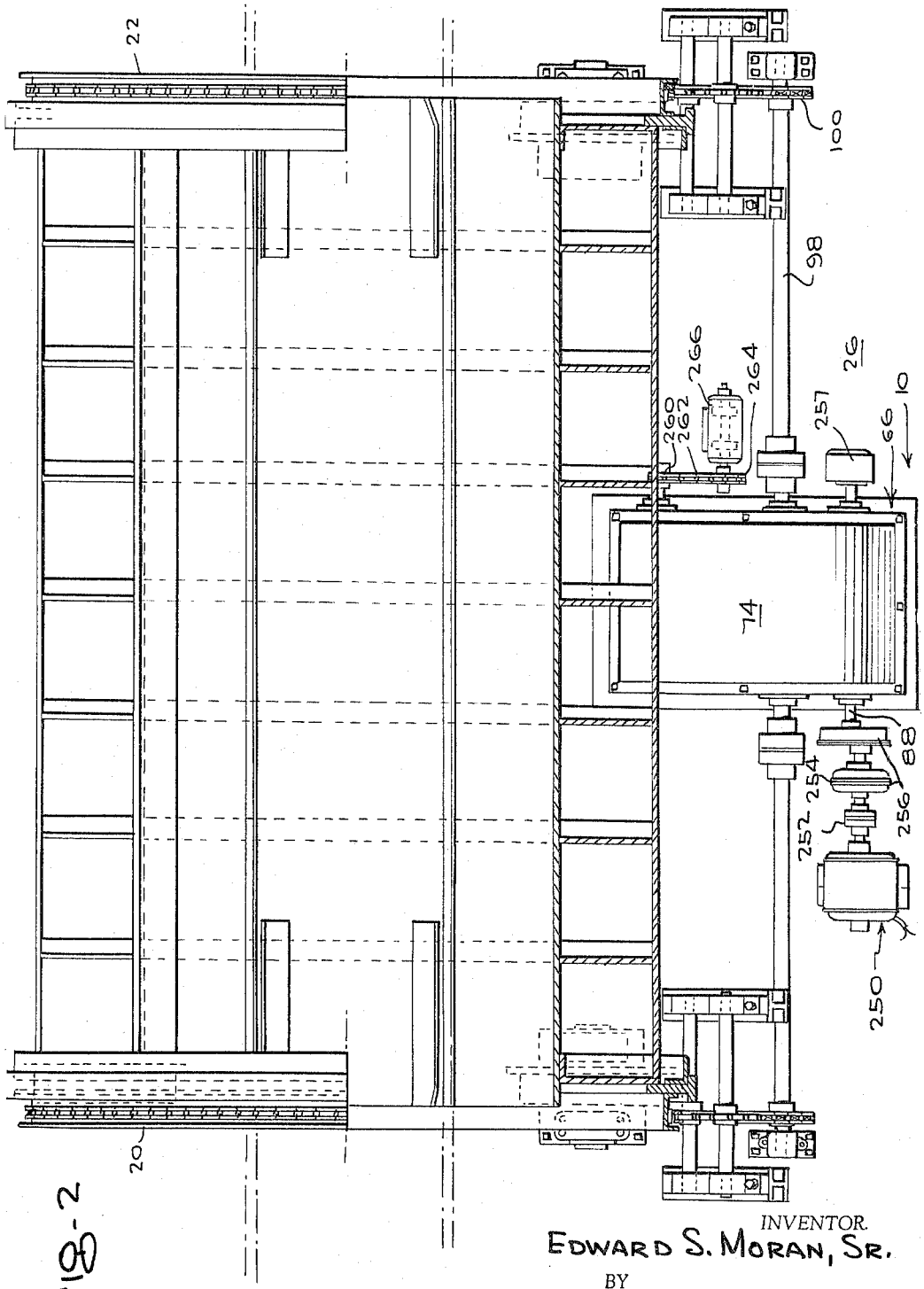
INVENTOR.
EDWARD S. MORAN, SR.
BY
McMorrow, Berman & Davidson
ATTORNEYS

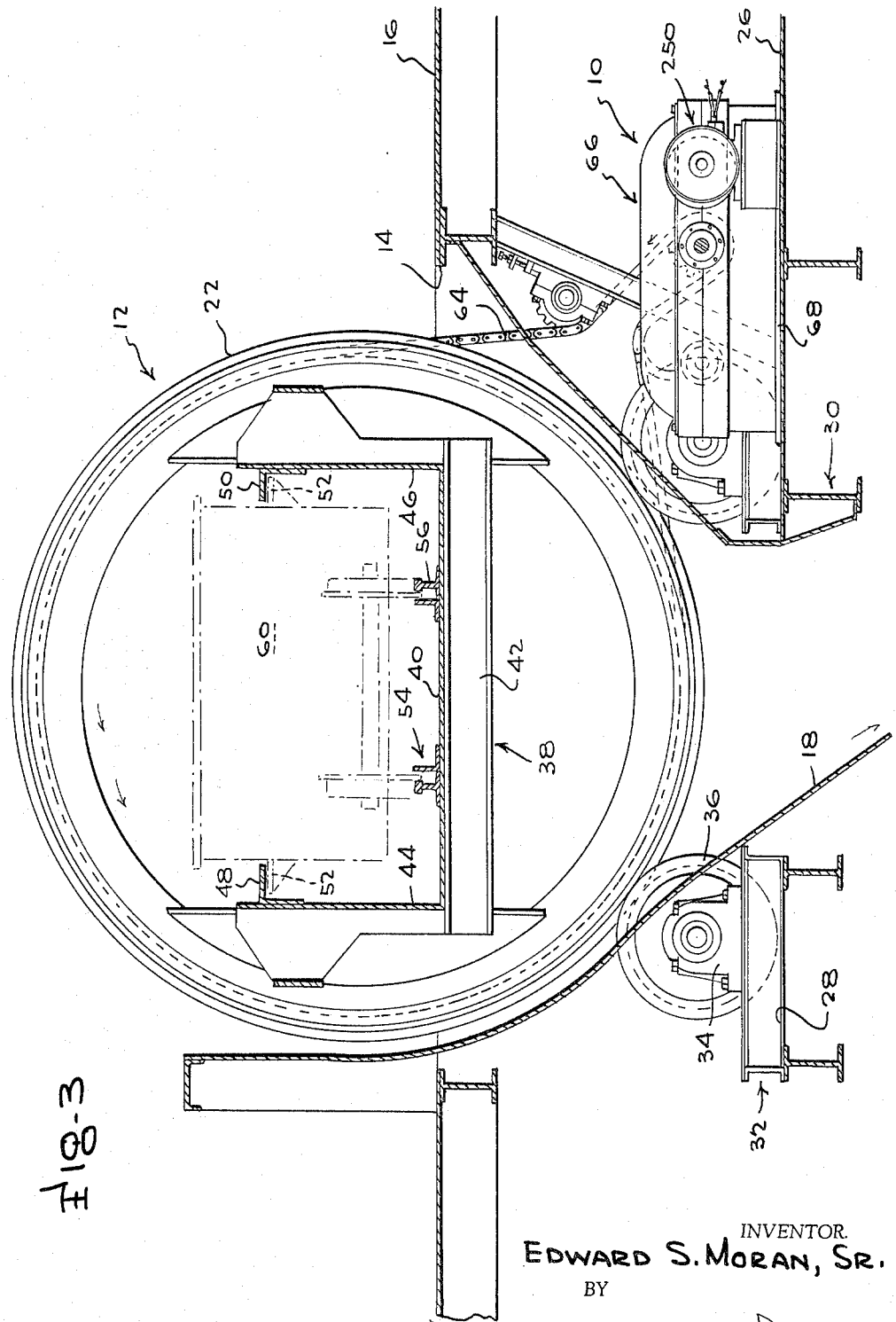

Sept. 27, 1966 E. S. MORAN, SR 3,274,845
INTERMITTENT DRIVE UNIT
Filed Sept. 13, 1963 7 Sheets-Sheet 4
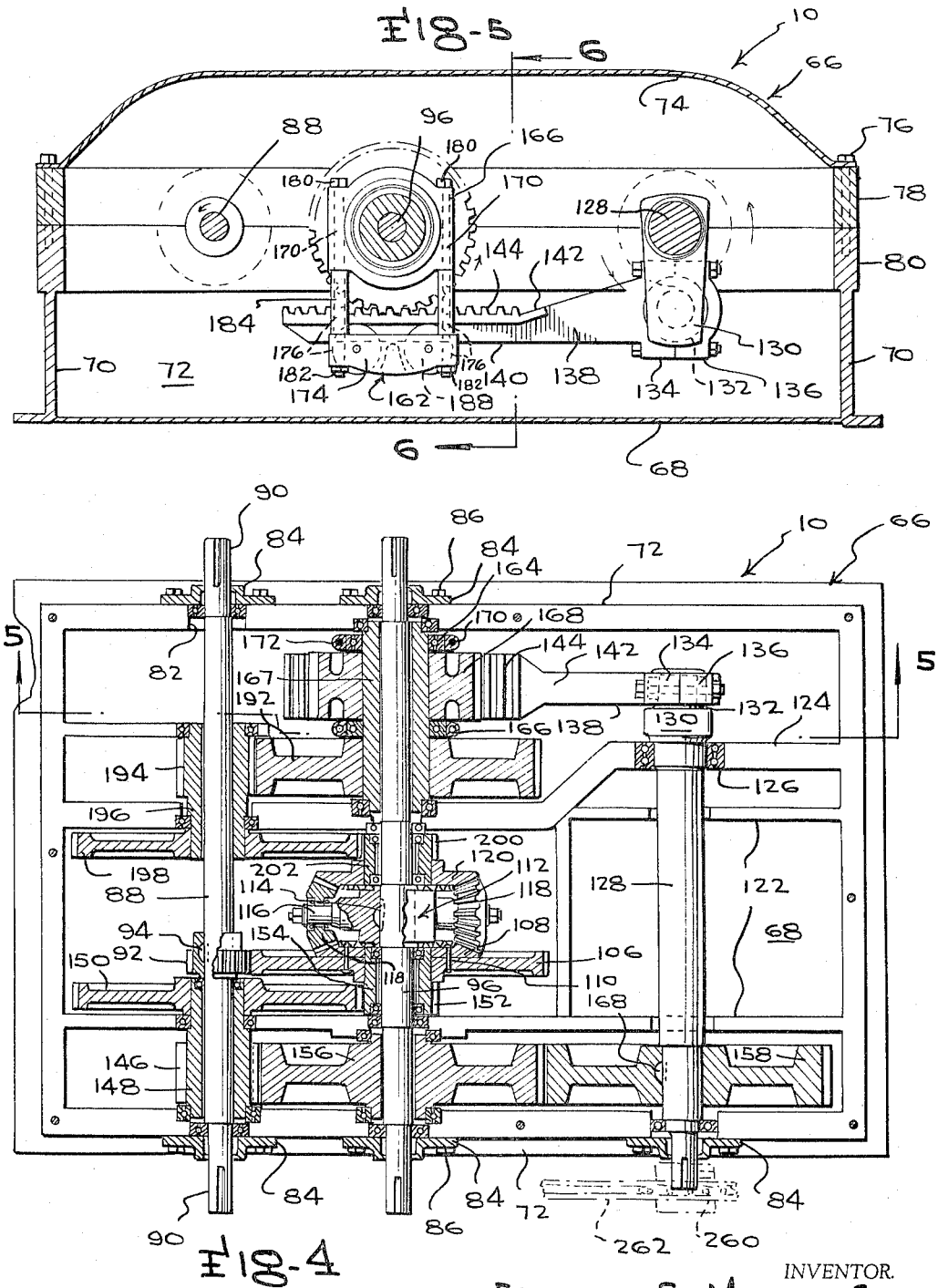
INVENTOR.
EDWARD S. MORAN, SR.
BY
McMorrow, Berman & Davidson
ATTORNEYS

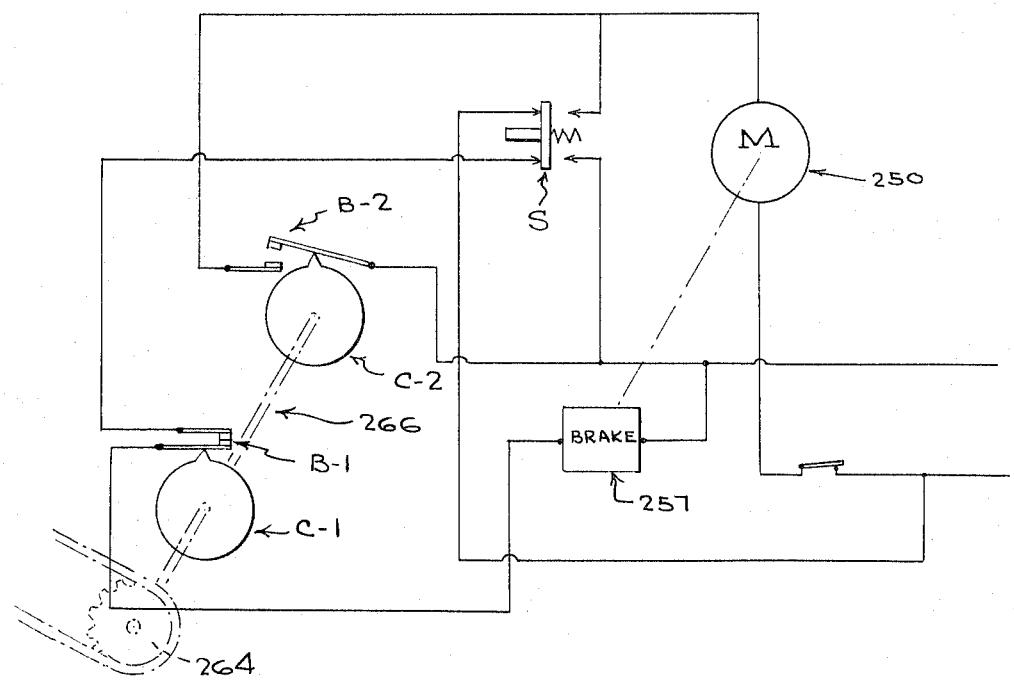
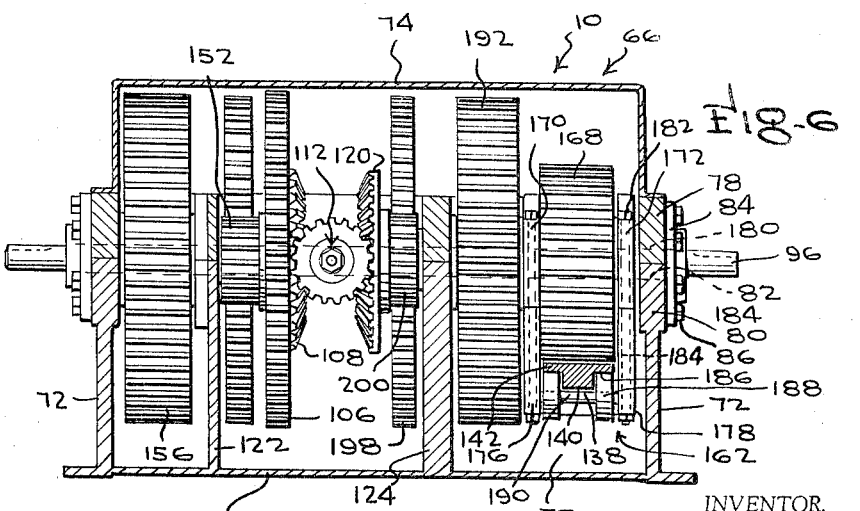

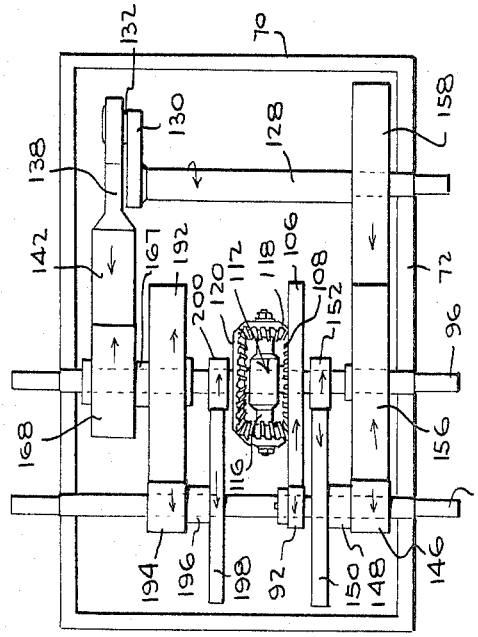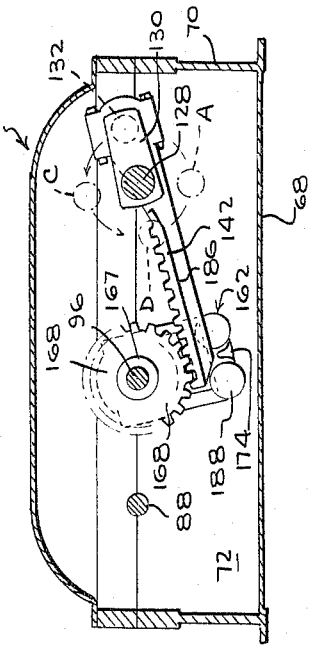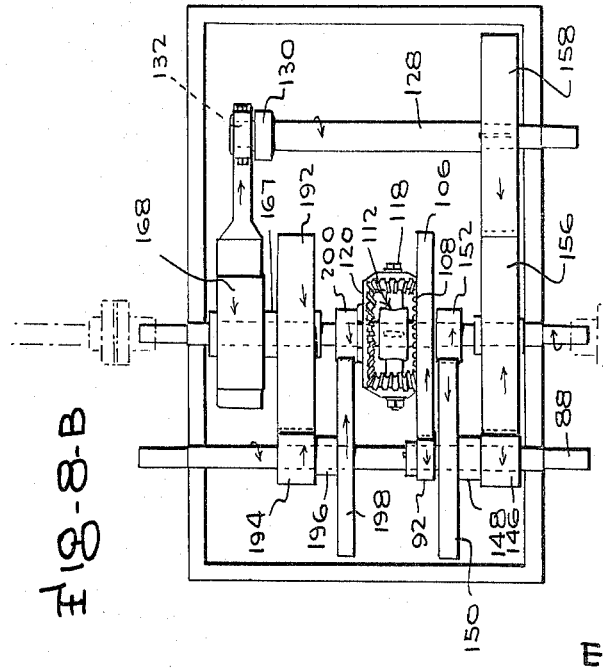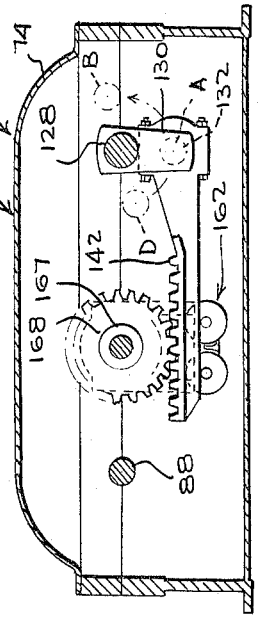

Sept. 27, 1966    E. S. MORAN, SR    3,274,845
INTERMITTENT DRIVE UNIT
Filed Sept. 13, 1963    7 Sheets-Sheet 7

INVENTOR.
EDWARD S. MORAN, SR.
BY
McMorrow, Berman & Davidson
ATTORNEYS

United States Patent Office 3,274,845
Patented Sept. 27, 1966

3,274,845
INTERMITTENT DRIVE UNIT
Edward S. Moran, Sr., 159 Fort Hill Drive,
Charleston, W. Va.
Filed Sept. 13, 1963, Ser. No. 308,752
5 Claims. (Cl. 74—394)

This invention relates to a drive unit, and more particularly, to an intermittent drive unit, which is adapted to transmit movement from a prime mover to a work element for movement of the work element to selected operational phases. An important objective of the invention resides in the transmission of movement to the work element in such manner as to complete the phase of operation with stoppage of the work element at a preselected location.

A further important objective attained by the present invention is the provision of a drive unit adapted for converting rotary power input of constant velocity to operational phases of variable velocity whereby a work element is provided with movement at varying speeds adapted to the needs of each phase of its operation.

In certain instances, an example of which appears below, it is necessary that work elements be activated through a selective rotary movement or movements, and upon conclusion of such movement, brought to a stop at a selected location. It is, sometimes, a further requirement that the speed of rotary movement of the work element be varied, selectively, as movement through the operational phases continues. The present invention provides a transmission adapted to activate such work elements through the desired operations at the selected speeds and to de-activate the work element a the conclusion of the operation—these objects being accomplished without the employment of complex gear transfer means, or braking means, each of which is subject to comparatively rapid wear, variance in operational characteristics by reason of atmospheric changes, and other variable factors, requires frequent maintenance and repair.

Another object is to supply a drive means employing a constant speed prime mover, an output shaft, and a crank type rack gear adapted to control the speed of the output shaft. A related object is to provide means to effectively mount a rack gear in mesh with a spur gear on a rotary shaft, for driving the spur gear in alternating directions—the means more specifically including a rack cradle swingably mounted on the spur gear shaft.

A principal objective of the invention, from the standpoint of structural innovation, resides in the provision of output axle having a cross shaft assembly fixed thereto for rotation therewith, the cross shaft assembly carrying bevel gears at each end thereof meshed with crown gears on the axle—one of the crown gears being driven at constant speed in one direction by the prime mover and the other crown being driven at variable speeds in at least two successive directions by the rack and spur gear means referred to supra—the axle being thereby adapted for rotation through specifically desired, sequential phases at varying speeds.

In one exemplary, preferred environment of use, the drive unit of this invention is employed in combination with a mine cardump assembly which includes a section of trackway in a track system, the section being positioned over a dump area or chute. As a mine car moves onto the section, the entire dump assembly, including the track section, is rotated 360°, thereby inverting the car over the dump area and emptying its contents thereinto. It is, of course, of great importance that the assembly rotate substantially an exact 360° rotation to return the track section to correct alignment with the remainder of the track system. In the prior art, this involves utilization of a brake unit acting against the dump assembly, the brake requiring frequent service and being often out of adjustment due to wear, atmospheric conditions, etc., causing misalignment of the track section following rotation with consequent time-consuming shut-down of mine operations. Another characteristic of the prior art dump apparatus is objectionable shock on the drive unit occasioned by starting and by brake application, and it is therefore an object of the present invention to provide a drive unit wherein the motor or prime mover is operating at full normal speed when the dump cycle is initiated, and which is stopped slowly without any jerk, shock, or impact on the drive unit.

Yet another object is to provide a mine car dump assembly capable of being started, revolved one full 360° rotation, and stopped in level condition.

General objectives include the provision of a drive unit of the character identified above which is relatively noncomplex to construct and operate, and durable in use. Other and further objects and advantages of the present invention will become apparent to those skilled in the art from a consideration of the following specification when read in conjunction with the annexed drawings, in which:

FIGURE 1 is a perspective view showing a dump assembly, drive unit, and prime mover constructed and assembled in accordance with the teachings of this invention;

FIGURE 2 is a top plan view of the material seen in FIGURE 1, partially in cross section;

FIGURE 3 is a vertical cross section taken substantially on the section line 3—3 of FIGURE 1, looking in the direction of the arrows, there being illustrated surrounding environmental elements omitted from FIGURES 1 and 2;

FIGURE 4 is an enlarged view of the drive unit of this invention, taken in section along the line 4—4 of FIGURE 1, looking in the direction of the arrows;

FIGURE 5 is a detail sectional view along the line 5—5 of FIGURE 4, looking in the direction of the arrows;

FIGURE 6 is a vertical, detail sectional view of the unit, taken on the line 6—6 of FIGURE 5, looking in the direction of the arrows;

FIGURE 7 is a schematic diagram of a preferred circuit employed in the unit;

Figure 10:
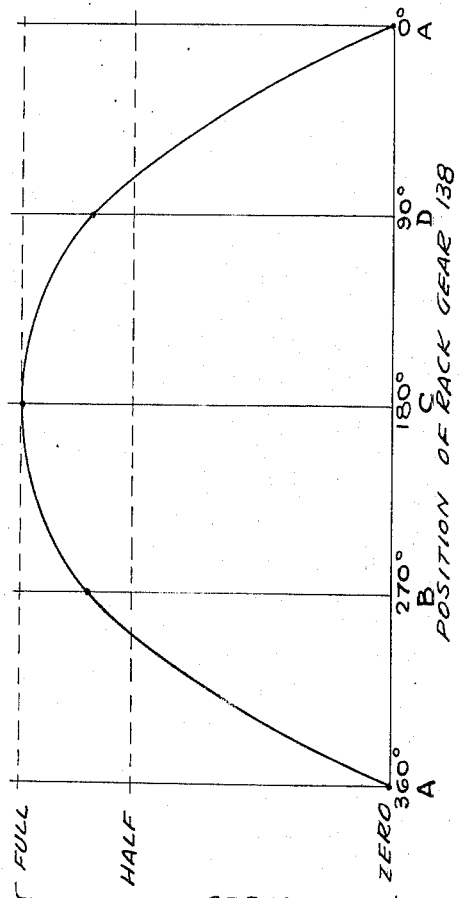

FIGURES 8-A and 8-B are diagrammatic side and top views, respectively, showing gearing location of the drive unit at one phase of operation;

FIGURES 9-A and 9-B are side and top diagrammatic views, respectively, of the unit at another phase; and FIGURE 10 is a tabular and diagrammatic illustration of unit operation.

The drive unit of this invention is generally designated throughout the drawings by reference numeral 10.

Proceeding initially to a description of a preferred environment of use of the drive unit 10, in FIGURES 1–3 a mine cardump assembly 12 is shown suitably mounted in an opening 14 in a floor structure 16 over a funnel or chute 18 which is adapted to direct dumped materials into a railway transport car or other container (not shown). The assembly 12 includes a pair of upstanding ring member 20, 22 each having endless toothed projections 24 extending therefrom. Subfloors 26 and 28 are mounted on a superstructure 30, and supporting means 32 are positioned thereon and have bearings 34 carrying rollers 36 which support the rings 20 and 22 in the manner shown.

The rings 20 and 22 are fixedly secured at opposite ends of a cardump 38 having a base 40 rigidified by exterior cross members 42, and having sides 44, 46. Sides 44 and 46 have holding means or inward flanges 48, 50 secured thereto adjacent their upper ends adapted to releasably-engage with mine car side flanges 52 (FIGURE 3) in a manner described in more detail below.

The base 40 carries a rail section 54 comprised of rails 56 of conventional design which section 54, as seen in FIGURE 1, is interposed in the mine track rail system 58. A loaded mine car 60, or usually one of a string thereof with swivel couplings (not shown), is moved onto the cardump 38 with its side flanges 52 riding under the inward flanges 48, 50 of the dump sides 44, 46 whereby it is held in fixed postion on the rails 56 and prepared for unloading. The ring members 20 and 22 are of the same circumference and of an internal area such as to permit the ingress and egress of the mine car 60, FIGURE 3, containing a charge of bulk material onto and off of the pair of rails 56 on the car dump 38.

Link drive chains 62, 64 are trained about the rings 20 and 22, and the chains engage the teeth 24 whereby movement of the chains effectuates movement of the rings and the cardump 38 secured thereto. Upon a full 360° rotation, the contents of car 60 is effectively emptied into the chute or funnel 18.

The drive unit 10, shown in detail in FIGURES 4–6 comprises a housing 66 having a base 68 secured to the sub-floor 26 and having end walls 70 and side walls 72. A removable housing cover 74 is supplied and is secured to the side and end walls by bolts 76 which also extend through enlarged, separable upper and lower portions 78, 80 respectively, of the walls (best seen in FIGURES 4 and 5) whereby the wall sections are adapted for dismounting for the purpose described below.

The portions 78 and 80 are provided with suitable openings 82 at spaced locations along the sides to receive bearing mounts 84 for plural axles extended between the side walls. As seen in FIGURES 4 and 6, bearing mounts 84 are fixed to the portions 78 and 80 of the side walls 72 by bolts 86.

An input axle 88, having reduced diameter ends 90 riding in opposite bearings 84, is journalled between the side walls for rotation in one direction (counter-clockwise in FIGURE 5), at a constant speed, to transmit power to the unit from a prime mover described below. Fixed to the input axle 88 for rotation therewith in said direction at said speed is a first spur gear 92. Gear 92 is locked to the input axle, as by a key 94.

Spaced from the input axle 88 and parallel thereto is an elongated drive shaft 96 journalled between the side walls 72 in a second pair of bearings 84 and having end portions 98 which, as seen in FIGURE 1, extend outwardly a substantial distance and carry drive sprockets 100 for the chain 64, the ends of portions 98 riding in bearing assembly 102 fixed to the sub-floor 26. Adjustable idler sprocket assemblies 104, to permit selective application of tension to the chains 64, 62 are also supplied.

Drive shaft 96 is adapted for rotation in a single direction at variable speeds, the direction being opposite to that of the input axle 88. As seen in FIGURES 4, 8 and 9, the first spur gear 92 of the input axle 88 is meshed with the gear 106 rotatably mounted on the drive shaft 96 which carries a crown gear 108 fixed to its inboard side by pins 110 for rotation therewith. Due to the engagement of gear 106 and its crown 108 with spur gear 92, gear 106 and crown 108 rotate constantly at a constant speed in the direction opposite to the rotational direction of input shaft 88. It is to be noted that spur gear 92 and gear 106 constitute gear means for drivingly-connecting the input shaft or axle 88 to the drive shaft 96.

A cross axle assembly 112 is fixed in perpendicular relation to the shaft 96 for rotation therewith, as by key connection 114, and has opposite end portions 116 (FIGURE 4) carrying beveled gears 118 which mesh with the crown gear 108 and a similar drive crown gear 120 also rotatably-mounted on the shaft 96.

A plurality of interior, upstanding bearing support walls 122 are provided within the housing 66, including a main support wall 124 having a bearing 126 aligned with one bearing 84 of the side wall 72. A control axle 128 is mounted in the bearing 126 and its aligned wall bearing 84, and has a perpendicular crank 130 rotatably-mounted thereon, the crank 130 carrying a crank pin 132 adjacent its distal end. On the crank pins 132 are journaled bearing halves 134 and 136 forming an inward end of an elongated crank shaft or rack gear 138. Rack gear 138 has a lower edge 140 and an upper side 142 provided with rack teeth 144.

The control axle 128 is rotated constantly in one direction during unit operation through a power train from the input shaft 88, the power train involving a second spur gear 146 mounted on a shaft sleeve 148, best seen in FIGURE 4. The sleeve 148 is rotated by a gear 150 meshed with a third spur gear 152 on a sleeve mount 154 which also carries the gear 106 and the third spur gear is therefore driven thereby. The second spur gear 146 is meshed with an intermediate gear 156 rotatably mounted on the drive shaft 96 which, in turn, is meshed with a driving gear 158 fixed to the control axle 128 by a key 160. Thus, the control axle 128 is rotated in the direction shown in FIGURES 8–B and 9–B at a substantially constant speed.

A new and novel cradle assembly 162 for the rack gear 138 is provided, and includes bearings 164, 166 joined about a sleeve 167 on the drive shaft 96 at each side of a pinion 168 thereon, the pinion being in mesh with the rack teeth 144. Each of the bearings 164 and 166 has an elongated sleeve 170 and 172 (FIGURE 4) at its sides, and is vertically aligned with a roller carrying member 174 also having side sleeves 176, 178 vertically aligned, respectively, with sleeves 170 and 172. Bolts 180, with securing nuts 182 are extended through the aligned sleeves, and tubular spacer bushings 184 serve to correctly position the respective pairs of sleeves 170, 176 and 172, 178 from one another.

As best seen in FIGURE 6, the upper side 142 of the rack gear 138 is laterally enlarged or extended such that the rack gear is of generally T-shaped cross section, and includes under sides 186. In FIGURES 5 and 6, it is seen that roller bearings 188, mounted on cross axles 190 in the members 174 serve to support the rack 138, the undersides 186 of the rack 138 riding on the rollers 188 as the rack 138 moves forwardly and rearwardly. The entire cradle 162 is pivotal with respect to the sleeve 167 to compensate for the change in angular relation of the rack which occurs as the lever 130 is rotated on the control axle 128.

Mounted on the sleeve 167 adjacent the pinion 168 and rotated therewith is an enlarged gear wheel 192 (FIGURE 4) meshed with a spur gear 194 mounted on a sleeve 196 on the input axle 88. A driving gear 198 is mounted on the said sleeve 196 and rotates therewith to drive a spur gear 200 on the drive shaft 96. The spur 200 includes an inward sleeve 202 to which is fixed the control crown gear 120. It is to be noted that a first gear train drivingly-connects the crown gear at one side of the cross-axle 112 or crown gear 108 to the control axis 128, such train consisting of the spur gear 152, gear 150, pinion 146, spur gear 156, and spur gear 158 pinned to the control axle 128. Also, a second gear train drivingly-connects the crown gear at the other side of the cross-axle 112 or crown gear 120 to the rack gear 138, such train consisting of a spur gear 200, driving gear 198, spur gear 194, and gear wheel 192 carried by the sleeve 167 rotatable about the drive shaft 96.

Referring once again to FIGURES 1–3, as illustrated therein, the unit 10 is suitably powered by a prime mover such as an electric motor 250 operatively connected to the input shaft 88 through a suitable coupling including a coupling element 252, a clutch 254, and a reduction gear assembly 256. Thus, rotary movement is supplied to the shaft 88. On the side of the housing 66 opposite the motor 250, the shaft 88 extends outwardly (as seen in FIGURE 2), and has mounted on its distal end a brake assembly 257 of any suitable type.

The control axle 128 extends through one side wall 72 as seen in FIGURE 4 and carries a sprocket 260 thereon driving a pulley means 262 secured to a sprocket 264 on a control switch assembly 266 having interior cam means shown diagrammatically in FIGURE 7 and described in more detail below.

In operation, the unit 10 functions to effect one complete 360° rotation of the cardump 12. Operation may be instituted as in the disclosed embodiment wherein a suitable switch means S (FIGURE 7) of any desired type is effective, upon actuation, to complete an electrical circuit to the motor 250 and to break the circuit normally actuating the shaft brake 257. Initial movement of the unit 10 and its gearing, and particularly, the control shaft 128, carrying the sprockets 260–264, permits separation of the brake contact B–1 in FIGURE 7 and closes the circuit at B–2 actuating the motor 250 for one full revolution of the cams C–1 and C–2 of the control switch 266. Upon one full rotation, cams C–1 and C–2 return to the original position closing the brake circuit and opening the motor circuit, thereby positively preventing further rotation of the cardump.

It should be understood that brake 257 acts merely on the input shaft 88 and not on the cardump 12. Brake 257 is not a critical feature of the invention insofar as its structure is concerned, and the circuit, the brake 257, and the switch assembly 266 are exemplary only of various means adapted for supplying power to the unit 10. Unit 10, through positive drive action described below effectively controls the rotation of the cardump 12.

Assuming the provision of rotary drive power of constant speed supplied to the input shaft 88 through suitable means, whereby the shaft is rotated in one direction at a constant speed, the following operation will be seen to result. Referring to FIGURES 8–A through 9–B, it will be noted therein that FIGURES 8–A and 8–B show the unit elements in full lines in an at rest position. Upon the application of constant speed rotary movement to the input shaft 88 from the prime mover 10, the keyed spur gear 92 is driven therewith and drives the gear 152 and its shaft 154, which rotates the crown 108 and the gear 152. Driving of the gear 152 in turn drives the gear 150, its shaft 148, and the gear 146—thereby actuating the power train consisting of gears 146–156–158—to rotate the control axle 128 in the same direction as the input axle 88 at a ratio of revolution controlled by gear dimensions and selected in accordance with a particular application of the unit.

The control axle, as it rotates at the selected ratio, carries its crank portion 130 from the vertical, down position A in FIGURE 8–A to an inclined horizontal position B therein, during this phase pulling the rack gear 138 to the rear and rotating the pinion 168 counter-clockwise in said figures. This rotates the shaft 167 and gear wheel 192 driving the spur gear 194 and its sleeve 196 with driving gear 198, also driving the spur gears 200 and connected control crown 120 in a direction opposite to that of the drive crown 108. Thus, the bevel gears 118 are caused to spin in place on the cross axle 116, the shaft 96 being held stationary.

When the crank 130 reaches the B position of FIGURE 8–A, shown in full lines in FIGURE 9–A, there is a momentary hesitation of the rack gear 138 as it changes its direction of movement (e.g. from the previous movement to the right in said figures to a movement to the left therein). As the crank 130 moves from the FIGURE 9–A position through location C to position D the gear 138 moves from right to left in that figure, driving the pinion 168 in a direction opposite to its first direction, thus reversing the spur gears 200 and causing the control crown 120 to move in the same direction as the drive crown 108—thus speeding the rotation of cross axle 112 and, in turn, the shaft 96. When the crank 130 reaches position D in FIGURES 8–A and 9–A, there is another momentary hesitation followed by further movement of the gear 138 in its initial right to left direction which again slows, and finally stops the shaft 96. During this operation, the control axle 128 has rotated the control means to operate the cam-type circuit breakers C–1 and C–2 which close the circuit to the brake and shut off power to the prime mover when the crank 130 returns to point A.

As will be apparent from the foregoing, this operation has resulted in one full 360° rotation of the drive shaft 96 in the sequence of a slow initial 90° movement, a relatively rapid 180° movement, and a final relatively slow 90° movement. This has caused the cardump 12 to rotate in the same manner, that is, by a slow initial 90° movement, a fast 180° movement (in which case the car is inverted), and a slow final 90° movement.

Referring to the specific operation of a cardump unit as shown in the drawings, it will be noted that the drive unit 10 of this invention comprises two series of gear arrangement and a crankshaft-like rack gear 138. In this instance, the crankshaft or rack gear is at a 1 to 1 ratio with the cardump and is adapted for continuous operation with the input shaft through one gear assembly.

The starting-running speed and stopping of the cardump 12 is controlled by the position of the rack gear 138. The drive crown gear 108 runs constantly in the right-hand direction indicated in FIGURE 8–B. When the rack gear 138 is in the position shown at A in FIGURE 8–A, it drives the pinion 168 at full speed in the left-hand direction as it moves to position B therein. The pinion 168, through the indicated gear assembly, drives the control crown 120 in the left-hand direction and at the same speed as the drive crown 108. With the drive and control crowns running at the same speed and in opposite directions, the bevel gears 118 do not revolve around the dump shaft. This holds the dump in the stopped, level position.

When the rack gear advances from position A to position B in FIGURE 8–A, the pinion 168 and the control crown 120 stops revolving. The drive crown 108 continues to run at full speed. With the drive crown 108 running at full speed and the control crown 120 stopped, the bevel gears 118 revolve around the control crown 120 driving the cardump 12 at half speed near the end of the first quarter turn.

When the rack gear 138 advances from position B to position C (FIGURE 9–A), it drives the control crown 120 at the same full speed and direction as the drive crown 108. The drive crown 108 and control crown 120 drive the bevel gears 118 around the dump shaft at the same speed. The bevel gears 118 drive the dump at full speed near the position of one-half turn.

When the rack gear 138 advances from position C to position D, it stops the pinion 168 and the control crown 120 from revolving. The drive means 108 continues to revolve at full speed. With the control crown 108 revolving at full speed and the control crown 120 not revolving, the bevel gears 118 drive the dump drive shaft 96 at half speed.

When the rack gear 138 has advanced from position D to position A, it drives the pinion 168 at full speed in the opposite direction. The pinion 168 drives the control crown 120 at the same speed as the drive crown 108 and in the opposite direction. With the drive crown 108 running in one direction and the control crown 120 running in the opposite direction at the same speed, the bevel gears 118 do not revolve around the axis of the drive shaft. This stops the drive shaft from revolving and, in effect, locks it in the level position. The dump will not restart until the speed of the control crown 120 has been reduced from the speed of the drive crown 108. Due to the action of the brake assembly as set forth above, this does not take place until another cycle of operation is instituted through actuation of the switch means.

The foregoing unit operation is graphically shown in FIGURE 10.

Having described and illustrated an embodiment of this invention as applied in a specific environment for use in some detail, it will be understood that this description and illustration are offered merely by way of example, and that the invention is to be limited in scope only by the appended claims.

What is claimed is:

1. A drive unit operatively interposed between a prime mover and a work element comprising:
   (a) a base;
   (b) an input safety rotatably mounted on the base and being supplied with rotary movement in one direction by the prime mover;
   (c) a drive shaft rotatably mounted on the base;
   (d) a control axle rotatably mounted on the base;
   (e) gear means drivingly-connecting the input shaft to the drive shaft;
   (f) a cross-axle fixed to the drive shaft and carrying beveled gears at each end meshed with a crown gear at one side and another crown gear at the other side;
   (g) a first gear train drivingly-connecting the crown gear at the one side of the cross-axle to the control axle;
   (h) offset crank means on the control axle;
   (i) a rack gear carried by the crank means and movable therewith in two directions as the crank means is rotated by the control axle; and
   (j) a second gear train drivingly-connecting the crown gear at the other side of the cross-axle to the rack gear.

2. A drive unit as defined in claim 1, which includes in addition:
   (k) drive sprockets on the opposed ends of the drive shaft; and
   (l) drive chains connecting the drive sprockets to ring members provided on the work element.

3. A drive unit operatively interposed between a prime mover and a work element comprising:
   (a) a base with upstanding side walls;
   (b) an input axle journalled between the side walls;
   (c) power means for the input axle transmitting rotary movement thereto in one direction;
   (d) a drive gear keyed to the input axle for rotation therewith in said one direction;
   (e) an elongate drive shaft journalled in the housing and having end portions extending outwardly thereof;
   (f) sprocket means on the end portions of the drive axle;
   (g) a second gear on the drive shaft, in mesh with the drive gear of the input axle and driven thereby;
   (h) a cross axle fixed to the drive shaft carrying bevel gears at each end meshed with a crown gear at one side secured to the second gear, and to a control crown gear at the other side;
   (i) a control axle journalled in the housing;
   (j) offset crank means on the control axle;
   (k) a rack gear carried by the crank means and movable therewith in two directions as the crank means is rotated by the control axle;
   (l) drive means interposed between and connected to the drive and control axles effecting rotation of the control axle in said one direction;
   (m) a pinion rotatably mounted on the drive shaft in mesh with the rack gear;
   (n) a third gear rotatably mounted on the input axle;
   (o) gear means interconnecting the third and pinion gears; and
   (p) a driven gear rotatably mounted on the drive shaft and fixed to the control crown, meshed with the third gear, whereby the direction of the control crown rotation is the same as the direction of rotation of the third gear.

4. A drive unit operatively interposed between a prime mover and a work element comprising:
   (a) a base;
   (b) an input shaft rotatably mounted on the base and being supplied with rotary movement by the prime mover;
   (c) a drive shaft rotatably mounted on the base;
   (d) a control axle rotatably mounted on the base;
   (e) a drive gear secured to the input shaft for rotation therewith in one direction;
   (f) a second gear on the drive shaft, in mesh with the drive gear of the input shaft and driven thereby;
   (g) a cross axle fixed to the drive shaft carrying bevel gears at each end meshed with a crown gear at one side secured to the second gear, and to a control crown gear at the other side;
   (h) offset crank means on the control axle;
   (i) a rack gear carried by the crank means and movable therewith in two directions as the crank means is rotated by the control axle;
   (j) drive means interposed between and connected to the drive and control axles effecting rotation of the control axle in said one direction;
   (k) a pinion rotatably mounted on the drive shaft in mesh with the rack gear;
   (l) a third gear rotatably mounted on the input shaft;
   (m) gear means interconnecting the third and pinion gears; and
   (n) a driven gear rotatably mounted on the drive shaft and fixed to the control crown, meshed with the third gear, whereby the direction of the control crown rotation is the same as the direction of rotation of the third gear.

5. A drive unit for a rotary dump of the type including a rail assembly, ring means about the ends of the rail assembly riding on rollers, and drive chains about the ring means, the drive unit being adapted to transmit power to the chains to effect one complete rotation of the rail assembly and to limit the rotation to said one rotation, the drive unit comprising:
   (a) a base with upstanding side walls;
   (b) an input axle journalled between the side walls;
   (c) power means for the input axle transmitting rotary movement thereto in one direction;
   (d) a drive gear keyed to the input axle for rotation therewith in said one direction;
   (e) an elongate drive shaft journalled in the housing and having end portions extended outwardly thereof;
   (f) sprocket means on the end portions of the drive axle for driving said chains;
   (g) a second gear on the drive shaft, in mesh with the drive gear of the input axle and driven thereby;
   (h) a cross axle fixed to the drive shaft carrying bevel gears at each end meshed with a crown gear at one side secured to the second gear, and to a control crown gear at the other side;
   (i) a control axle journalled in the housing;
   (j) offset crank means on the control axle;
   (k) a rack gear carried by the crank means and movable therewith in two directions as the crank means is rotated by the control axle;
   (l) drive means interposed between and connected to the drive and control axles effecting rotation of the control axle in said one direction;
   (m) a pinion rotatably mounted on the drive shaft in mesh with the rack gear;
   (n) a third gear rotatably mounted on the input axle;
   (o) gear means interconnecting the third and pinion gears;
   (p) a driven gear rotatably mounted on the drive shaft and fixed to the control crown, meshed with the third gear, whereby the direction of the control crown rotation is the same as the direction of rotation of the third gear;

(q) the crankshaft moving away from the drive axle from a first at rest position wherein the rail assembly is horizontal and the cross axle is horizontal with the crown gear and control crown moving in opposite directions, through a retract phase wherein the crankshaft causes movement of the control crown in a direction opposite to that of the driven crown whereby the cross axle is rotated at a reduced speed thereby slowing the rotation of the track assembly away from the horizontal, through a reversing phase wherein the crank causes movement of the control crown in the same direction as the driven crown to speed rotation, through a final phase wherein the crank moves in the first named direction to slow the driveshaft.

References Cited by the Examiner
UNITED STATES PATENTS

| | | | |
|---|---|---|---|
| 2,301,543 | 11/1942 | Hlavaty | 74—117 |
| 2,465,502 | 3/1949 | White | 214—55 |
| 2,547,453 | 4/1951 | Egg | 74—679 |
| 2,634,006 | 4/1953 | Criner et al. | 214—55 |
| 2,775,140 | 12/1956 | Loos | 74—394 X |
| 2,826,097 | 3/1958 | Panciroli | 74—679 |
| 2,984,364 | 5/1961 | Lamb | 214—55 X |
| 2,987,163 | 6/1961 | Eddison et al. | 74—84 X |

FRED C. MATTERN, JR., *Primary Examiner.*

BROUGHTON G. DURHAM, *Examiner.*

F. E. BAKER, *Assistant Examiner.*